United States Patent
Paniccia (10) Patent No.: US 12,422,258 B2
(45) Date of Patent: Sep. 23, 2025

(54) RING WAVEGUIDE BASED INTEGRATED PHOTONICS OPTICAL GYROSCOPE WITH BALANCED DETECTION SCHEME

(71) Applicant: Anello Photonics, Inc., Santa Clara, CA (US)

(72) Inventor: Mario Paniccia, Santa Clara, CA (US)

(73) Assignee: Anello Photonics, Inc., Santa Clara, CA (US)

( * ) Notice: Subject to any disclaimer, the term of this patent is extended or adjusted under 35 U.S.C. 154(b) by 26 days.

(21) Appl. No.: 18/298,262

(22) Filed: Apr. 10, 2023

(65) Prior Publication Data
US 2023/0332894 A1 Oct. 19, 2023

Related U.S. Application Data

(63) Continuation of application No. 17/493,707, filed on Oct. 4, 2021, now Pat. No. 11,624,615.

(60) Provisional application No. 63/087,614, filed on Oct. 5, 2020.

(51) Int. Cl.
*G01C 19/72* (2006.01)
*G01C 19/66* (2006.01)
*G02B 6/122* (2006.01)

(52) U.S. Cl.
CPC ........... *G01C 19/727* (2013.01); *G01C 19/66* (2013.01); *G02B 6/122* (2013.01)

(58) Field of Classification Search
CPC ............. G01N 21/3103; G01N 21/645; G01N 2021/6471; G01N 2201/068; G01N 21/6408; G01N 21/63; G01K 11/00; G01K 11/20
See application file for complete search history.

(56) References Cited

U.S. PATENT DOCUMENTS 4,807,999 A * 2/1989 Soo Hoo .............. G01C 19/727
356/470
5,018,857 A 5/1991 Sanders et al.
(Continued)

FOREIGN PATENT DOCUMENTS

WO 2021108580 A1 6/2021

OTHER PUBLICATIONS

PCT International Search Report and Written Opinion for International Application No. PCTUS2021053631 mailed Jan. 25, 2022, 7 pages.
(Continued)

*Primary Examiner* — Mohamed K Amara
(74) *Attorney, Agent, or Firm* — Lowenstein Sandler LLP; Madhumita Datta (57) ABSTRACT

The present disclosure relates to integrated photonics-based optical gyroscopes with silicon nitride (SiN) waveguide-based microresonators. SiN microresonators are fabricated either on a fused silica platform or on a silicon substrate with oxide cladding. A narrow linewidth high-Q laser is hybridly integrated on a silicon photonics platform. The laser is tuned with a first SiN microresonator, and the rotational sensing component of the gyroscope comprises another SiN microresonator. The silicon photonics front-end chip has components for a balanced detection scheme to cancel noise in the optical signal coming back from the rotational sensing component.

20 Claims, 4 Drawing Sheets

(56) References Cited

U.S. PATENT DOCUMENTS

| | | | | |
|---|---|---|---|---|
| 5,100,236 | A * | 3/1992 | Hoo | G01C 19/66 356/470 |
| 5,112,128 | A * | 5/1992 | SooHoo | G01C 19/727 356/470 |
| 5,141,315 | A * | 8/1992 | Malvern | G01C 19/727 356/464 |
| 5,465,149 | A | 11/1995 | Strandjord et al. | |
| 7,106,448 | B1 | 9/2006 | Vawter et al. | |
| 7,123,800 | B2 | 10/2006 | Kaplan | |
| 7,372,574 | B2 * | 5/2008 | Sanders | G01C 19/727 356/461 |
| 7,463,360 | B2 | 12/2008 | Hughes et al. | |
| 7,522,284 | B2 * | 4/2009 | Sanders | G01C 19/727 356/461 |
| 7,535,576 | B2 * | 5/2009 | Keyser | G01C 19/727 356/470 |
| 8,446,590 | B2 | 5/2013 | Sanders et al. | |
| 8,923,352 | B2 | 12/2014 | Strandjord et al. | |
| 9,476,770 | B1 | 10/2016 | Green et al. | |
| 9,559,484 | B2 | 1/2017 | Morton et al. | |
| 10,088,452 | B2 | 10/2018 | Villani et al. | |
| 10,429,677 | B2 | 10/2019 | Puckett et al. | |
| 10,458,795 | B1 | 10/2019 | Grine et al. | |
| 10,731,987 | B2 | 8/2020 | Savchenko et al. | |
| 10,731,988 | B1 | 8/2020 | Paniccia et al. | |
| 10,809,460 | B2 * | 10/2020 | Dülk | G02B 6/2786 |
| 10,823,571 | B1 | 11/2020 | Wu et al. | |
| 10,833,472 | B1 | 11/2020 | Chen et al. | |
| 10,921,125 | B2 | 2/2021 | Rochus et al. | |
| 10,969,548 | B2 | 4/2021 | Pannicia et al. | |
| 11,079,233 | B2 | 8/2021 | Wu et al. | |
| 11,177,630 | B2 | 11/2021 | Vizbaras et al. | |
| 11,320,267 | B2 * | 5/2022 | Wang | G01B 9/02 |
| 11,493,343 | B2 * | 11/2022 | Feshali | G01C 19/721 |
| 11,624,615 | B2 * | 4/2023 | Paniccia | G02B 6/124 385/14 |
| 2004/0136412 | A1 | 7/2004 | Jones | |
| 2005/0196103 | A1 | 9/2005 | Kaplan | |
| 2006/0198415 | A1 | 9/2006 | Yamazaki | |
| 2007/0291273 | A1 | 12/2007 | Yokouchi et al. | |
| 2008/0117948 | A1 | 5/2008 | Wakabayashi | |
| 2008/0137091 | A1 * | 6/2008 | Sanders | G01C 19/727 356/461 |
| 2009/0046294 | A1 | 2/2009 | Kaplan | |
| 2009/0220184 | A1 | 9/2009 | Goldring et al. | |
| 2011/0141477 | A1 | 6/2011 | Sanders et al. | |
| 2012/0189025 | A1 | 7/2012 | Zheng et al. | |
| 2012/0224167 | A1 | 9/2012 | Sanders et al. | |
| 2014/0044142 | A1 * | 2/2014 | Strandjord | H01S 3/1304 372/32 |
| 2014/0240712 | A1 * | 8/2014 | Strandjord | G01C 19/727 356/461 |
| 2014/0369699 | A1 * | 12/2014 | Strandjord | G01C 19/723 398/187 |
| 2015/0293302 | A1 | 10/2015 | Czornomaz et al. | |
| 2016/0126381 | A1 | 5/2016 | Wang et al. | |
| 2017/0067743 | A1 | 3/2017 | Salit et al. | |
| 2017/0241784 | A1 | 8/2017 | Salit et al. | |
| 2018/0081112 | A1 * | 3/2018 | Puckett | G10K 11/24 |
| 2018/0306696 | A1 | 10/2018 | Ozdemir et al. | |
| 2018/0330946 | A1 | 11/2018 | Reano et al. | |
| 2019/0258004 | A1 | 8/2019 | Puckett | |
| 2020/0386944 | A1 | 12/2020 | Paniccia | |
| 2020/0393615 | A1 | 12/2020 | Bayn et al. | |
| 2021/0072459 | A1 | 3/2021 | Kippenberg et al. | |
| 2021/0124025 | A1 * | 4/2021 | Sarkissian | G01S 7/4812 |
| 2021/0149056 | A1 * | 5/2021 | Luff | G01S 17/931 |
| 2022/0260373 | A1 | 8/2022 | Paniccia et al. | |
| 2022/0326014 | A1 * | 10/2022 | Feshali | G02B 6/132 |
| 2022/0370010 | A1 * | 11/2022 | Zilkie | G02B 6/12004 |
| 2023/0130434 | A1 * | 4/2023 | Mokhtari-Koushyar | H04B 10/503 398/200 |
| 2023/0332894 | A1 * | 10/2023 | Paniccia | G01C 19/66 |
| 2024/0068813 | A1 * | 2/2024 | Paniccia | G01C 19/721 |

OTHER PUBLICATIONS

Jin, W., Yang, Qf., Chang, L. et al. Hertz-linewidth semiconductor lasers using CMOS-ready ultra-high-Q microresonators. Nat. Photonics 15, https://doi.org/10.1038/s41566-021-00761-7, pp. 346-353, Feb. 11, 2021.

* cited by examiner

RING WAVEGUIDE BASED INTEGRATED PHOTONICS OPTICAL GYROSCOPE WITH BALANCED DETECTION SCHEME

RELATED APPLICATIONS

This application is a continuation of and claims the benefit of U.S. patent application Ser. No. 17/493,707, filed Oct. 4, 2021, titled "Ring Waveguide Based Integrated Photonics Optical Gyroscope With Balanced Detection Scheme," which claims the benefit of U.S. Provisional Patent Application No. 63/087,614, filed Oct. 5, 2020, titled "Ring Waveguide Based Integrated Photonics Optical Gyroscope With Balanced Detection Scheme," the entireties of which are incorporated herein by reference.

TECHNICAL FIELD

The present disclosure relates to integrated photonics-based optical gyroscopes with waveguide microresonators.

BACKGROUND

Gyroscopes (also referred to in short as "gyros") are devices that can sense angular velocity. The applications of gyroscopes include, but are not limited to, military, aircraft navigation, robotics, autonomous vehicles, virtual reality, augmented reality, gaming etc. Gyroscopes can be mechanical or optical, and can vary in precision, performance, cost and size. Since optical gyroscopes do not have any moving parts, they have advantages over mechanical gyroscopes as they can withstand effects of shock, vibration and temperature variation better than the mechanical gyroscopes with moving parts. The most common optical gyroscope is the fiber optical gyroscope (FOG) that operates based on interferometric measurements of optical phase shift due to the Sagnac effect (a phenomenon encountered in interferometry that is elicited by rotation). Construction of a FOG typically involves a coil comprising several turns of polarization-maintaining (PM) fiber. Laser light is launched into both ends of the PM fiber coil so that two optical beams travel in opposite directions. If the fiber coil is moving, the optical beams traveling in opposite directions experience different optical path lengths with respect to each other. By setting up an interferometric system, one can measure the small path length difference that is proportional to the area of the loop enclosed by the turns of the fiber coil and the angular velocity of the rotating fiber coil.

However, FOGs are bulky because the Sagnac effect is relatively weak and to attain high performance, few hundreds to a few thousands of meters of fiber is needed (in the form of fiber coil with several turns). An alternative to FOG is resonant fiber optic gyroscope (RFOG) and ring laser gyro (RLG), where rotation-induced resonance frequency shift due to the Sagnac effect is much more prominent that the FOGs. As a result, the required length of fiber in an RFOG/RLG is orders of magnitude smaller than a FOG. Instead of a fiber coil with several turns in a FOG, a single loop of fiber is used in an RFOG/RLG, where light circulates several times.

Fiber-based gyroscopes can provide very high precision, but at the same time, they are of larger footprint, are very expensive, and are hard to assemble due to the devices being built based on discrete optical components that need to be aligned precisely. Often, manual alignment is involved, which is hard to scale up for volume production.

Present inventors propose replacing fibers with waveguide based integrated photonics components, including microresonators, for cost-effective easy integration on a semiconductor platform which is much more promising for volume production of gyroscopes.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

The present disclosure relates to integrated photonics-based optical gyroscopes with silicon nitride (SiN) waveguide-based microresonators. SiN microresonators are fabricated either on a fused silica platform or on a silicon substrate with oxide cladding. A narrow linewidth high-Q laser is hybridly integrated on a silicon photonics platform. The laser is tuned with a first SiN microresonator, and the rotational sensing component of the gyroscope comprises another SiN microresonator. The silicon photonics front-end chip has components for a balanced detection scheme to cancel noise in the optical signal coming back from the rotational sensing component.

Specifically, an aspect of the disclosure describes an optical gyroscope fabricated as an high-sensitivity integrated photonics chip, comprising: a first portion of the integrated photonics chip comprising waveguide-based optical components that launches narrow linewidth laser light to a second portion of the integrated photonics chip; and, a rotation sensing element in the second portion of the integrated photonics chip that receives the narrow linewidth laser light from the first portion, wherein the narrow linewidth of the laser light dictates a quality factor of the rotation sensing element, wherein the first portion and the second portion of the integrated photonics chip are packaged together on a common platform.

The first portion and the second portions can be stand-alone chips. The first portion can be a silicon photonics chip onto which a laser is bonded. The second portion can be a SiN waveguide chip. In one embodiment the second portion can be monolithically integrated to the common platform, while the first portion is hybridly integrated to the common platform.

BRIEF DESCRIPTION OF THE DRAWINGS

The present disclosure will be understood more fully from the detailed description given below and from the accompanying drawings of various implementations of the disclosure. Please note that the dimensions shown in the figures are for illustrative purposes only and not drawn to scale.

DETAILED DESCRIPTION

Aspects of the present disclosure are directed to compact ultra-low loss silicon nitride waveguide based angular rotation sensing chip which may be integrated with other system-level integrated photonics components for optical gyroscope applications.

A waveguide-based sensing chip having an input/output waveguide and a waveguide-based resonant ring can collectively replace a fiber coil of a FOG or a fiber loop of an RFOG. An integrated photonics front-end chip may be coupled with the waveguide-based sensing chip to constitute an integrated photonics optical gyroscope module which may be part of an inertial measurement unit (IMU) package. Note that IMU may have other components, such as accelerometers, in addition to the optical gyroscope module. Therefore, making the optical gyroscope module compact reduces the overall size, weight power and cost of the IMU. This weight reduction can be crucial for certain applications, for example, lightweight unmanned aerial vehicles. IMU may be a much-needed technology component for more established sensing technologies for autonomous vehicles, such as LiDAR (Light Detection and Ranging), radar and cameras that will be used in future generation of autonomous vehicles (both terrestrial and aerial).

One parameter-of-interest in IMU is Angle Random Walk (ARW), which is a noise parameter that describes average deviation or error that occurs when gyroscope signal is integrated over a finite amount of time to calculate angular movement of the moving object. In general, a low bias stability value corresponds to a low ARW, and a low bias estimation error. For example, a gyro with a bias instability of 0.5°/hr allows an ARW of 0.02-0.05°/√hr, which characterizes a high-performance gyroscope, such as a FOG. On the other hand, low-performance mechanical gyroscopes (such as a micro-electro-mechanical systems (MEMS)-based gyroscope) may have much higher ARW and bias stability values (e.g., ARW of >0.3°/√hr and a larger bias stability value of >3.5°/hr). High bias estimation error in the gyroscope measurement may render the data meaningless especially when the sensor also experiences thermal changes. The integrated photonics based optical gyroscope described in this application aims at bias stability in the range of 0.5°/hr, and an ARW in the range of 0.05°/√hr, i.e. offering performance equivalent to FOGs.

It has been experimentally demonstrated that low-loss waveguides are the key to high performance integrated photonics-based optical gyroscopes. In the optical waveguide-based angular rotation sensing chip (sometimes also referred to as a "gyro chip" or simply a "sensing chip"), low-loss waveguide core may be made of silicon nitride ($Si_3N_4$), and the waveguide cladding may be made of fused silica or oxide. Propagation loss varies with wavelengths and dimension of the SiN waveguide core. For the optimum wavelength, the loss can be close to 0.1 dB/m, which can be even reduced by improved process flow, and/or optimizing the height and width of the waveguide core.

Figure 1:
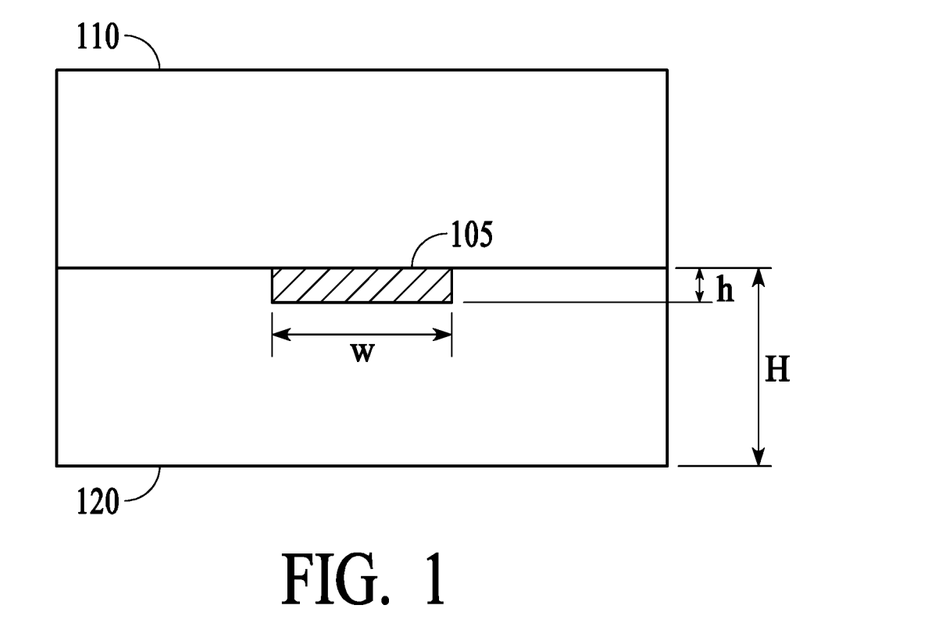
FIG. 1 illustrates a longitudinal cross sectional view of a SiN waveguide-based sensing chip with SiN waveguide core surrounded by fused silica cladding, according to an embodiment of the present disclosure.
Figure 2:
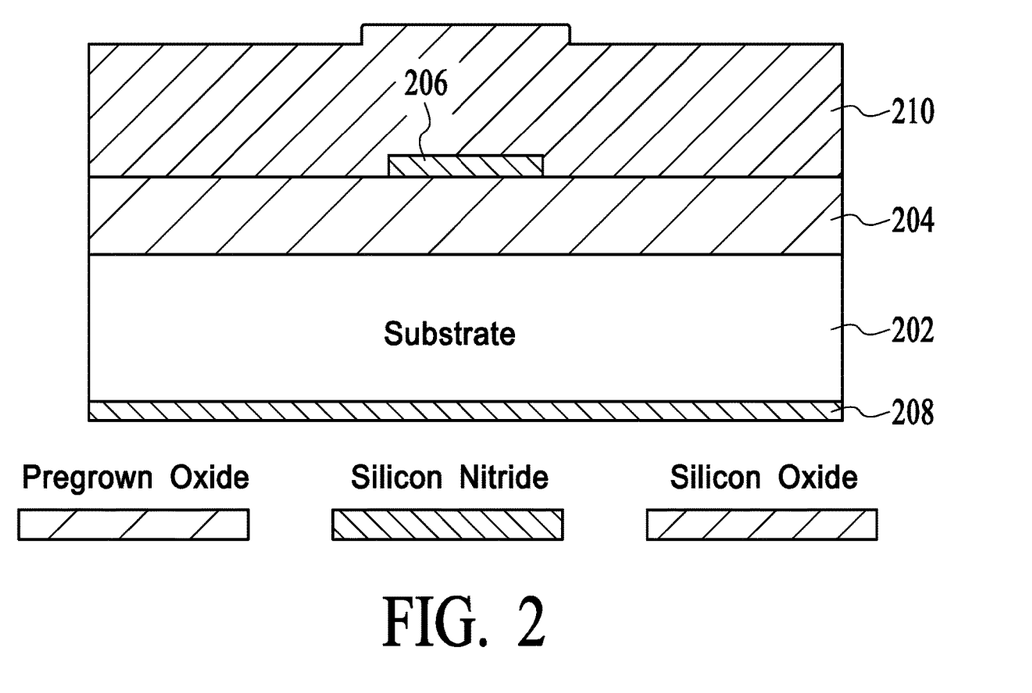
FIG. 2 illustrates a longitudinal cross-section of a SiN waveguide core with a silicon di oxide top cladding, according to an embodiment of the present disclosure.

FIG. 1 shows a longitudinal cross-sectional diagram showing a silicon nitride waveguide core 105 surrounded by fused silica cladding. This SiN core can be processed within oxide layers (as shown in FIG. 2) or within a pure fused silica cladding. In either case this waveguide structure is also referred to simply as SiN waveguide, and a chip containing the SiN waveguide is referred to as a SiN waveguide chip. The SiN waveguide structure for fused silica can be fabricated as follows: a trench is etched on a first fused silica wafer 120, where the first fused silica wafer acts as a first cladding. The waveguide core 105 is formed in the etched trench of the first fused silica wafer by depositing SiN in the trench and planaraizing it. A second fused silica wafer 110 is then bonded to the first fused silica wafer 120, where the second fused silica wafer 110 acts as a second cladding. The first cladding and the second cladding collectively completely surround the core 105 from the top, bottom and sides. The dimension of the trench is such that the waveguide core 105 has the required width 'w' and required height 'h'. The thickness of the cladding 'H' and the refractive index of the core/cladding are also chosen carefully so that the propagating mode is single mode. Details of the SiN-fused silica/oxide waveguide structure can be found in the earlier-filed U.S. patent application Ser. No. 16/894,120, titled, "Single-layer and multi-layer structures for integrated silicon photonics optical gyroscopes," filed on Jun. 5, 2020. Note that the SiN core can be fabricated in multiple layers, each core surrounded by corresponding upper and lower claddings (fused silica or oxide), if the sensing portion of the gyroscope is distributed in multiple vertical layers.

SiN waveguide cores (one layer or two layers) can be fabricated on a conventional silicon substrate with asymmetric upper cladding (Tetra Ethyl Ortho Silicate (TEOS)) and lower cladding (grown oxide), as shown in FIG. 2. Specifically, FIG. 2 shows a wafer with a substrate 202 with a pre-grown oxide layer 204. The substrate 202 may be a silicon substrate and the pre-grown oxide layer may be a crystalline layer with an example dimension of 10-15 μm. The key characteristics of the layer 204 is that it has low absorption peak at the wavelengths of interest (e.g., around 1550 nm, but not necessarily at exact 1550 nm, as the waveguide propagation loss may be optimized for a wavelength slightly different from 1550 nm.) The wafer may be polished on both sides.

FIG. 2 also shows that a SiN layer is deposited to form a layer on top of and adjacent to the pre-grown oxide layer 204, which is patterned to create waveguide core 206. A non-limiting illustrative dimension of the SiN waveguide core 206 is a height (i.e. thickness 'h' of the waveguide layer) of 60-100 nm and a lateral width of 2-10 μm. Persons skilled in the art would appreciate that these illustrative dimensional values mentioned in the specification are not limiting to the scope of the disclosure. The SiN layer may be deposited using Low Pressure Chemical Vapor Deposition (LPCVD) process or other processes. The bottom SiN layer 208 may remain intact, where the top SiN layer is photolithographically or otherwise patterned on the pre-grown oxide layer 204 to form waveguide core 206. In order to reduce line edge roughness in the SiN waveguide core 206, some post-etch treatment may be needed. For example, a blanket Argon (Ar) sputter step after photoresist and lithography assist layers (e.g., BARC) may be removed to smooth the top and sides of the SiN waveguide core 206. Alternatively, a blanket dip in hot phosphoric acid may be performed, which has very high selectivity between SiN (high etch rate) and the pre-grown oxide 204. Post-etch clean may include a Piranha clean (e.g., hot sulfuric acid mixed with peroxide) and SC1 (diluted hot ammonium hydroxide and peroxide mix) or SC2 (hydrochloric acid mixed with peroxide). Finally, a post-etch high temperature anneal may be performed to drive any remaining hydrogen or other impurities from the SiN layer. In an alternative embodiment, instead of a crystalline pre-grown oxide layer 204, other types of oxide start material can be used too as the bottom cladding, an example of which is non-crystalline fused silica ("glass") or quartz.

A silicon dioxide layer (also called TEOS layer) 210 is grown to cover the SiN waveguide core 206. The silicon oxide layer 210 may have a total thickness of 2-3 µm. The hydrogen in the TEOS layer needs to be minimized, and the growth rate is adjusted accordingly. Optionally, a pre-deposition anneal may be performed (e.g., at 1150-1200° C. for 2 or more hours). Total final thickness of the TEOS layer may be obtained in several rounds, e.g. each round producing a layer that is 0.1 to 0.2 µm thick. Note that the structure shown in FIG. 2 has asymmetric cladding around the waveguide core 206, as the upper cladding is TEOS (layer 210), and the lower cladding is grown oxide (layer 204). The waveguide loss depends largely on the quality of the TEOS layer acting as the upper cladding.

The oxide layer 210 comprises individual layers of deposited TEOS, each deposition followed by an anneal step to drive hydrogen away. Any arbitrary number of layers may be chosen depending on the deposition rate and anneal time. For example, if a total thickness of layer 210 is 2 µm, then ten layers may be deposited, each having 0.2 µm thickness. Typically a high-temperature LPCVD method is used for TEOS deposition. The method may start with a pre-deposition anneal. Then deposition-anneal-deposition-anneal sequence is repeated multiple times. For each anneal, the temperature may be 1150-1200° C. and the duration may be 2 hours. Note that instead of TEOS as the precursor gas, chlorinated sources or deuterated sources may be used for silicon oxide deposition. The oxide-cladding waveguide structure can be found in earlier-filed U.S. Provisional Patent Application No. 62/986,379, titled, "Process flow for fabricating integrated photonics optical gyroscopes," filed on Mar. 6, 2020.

Figure 3:
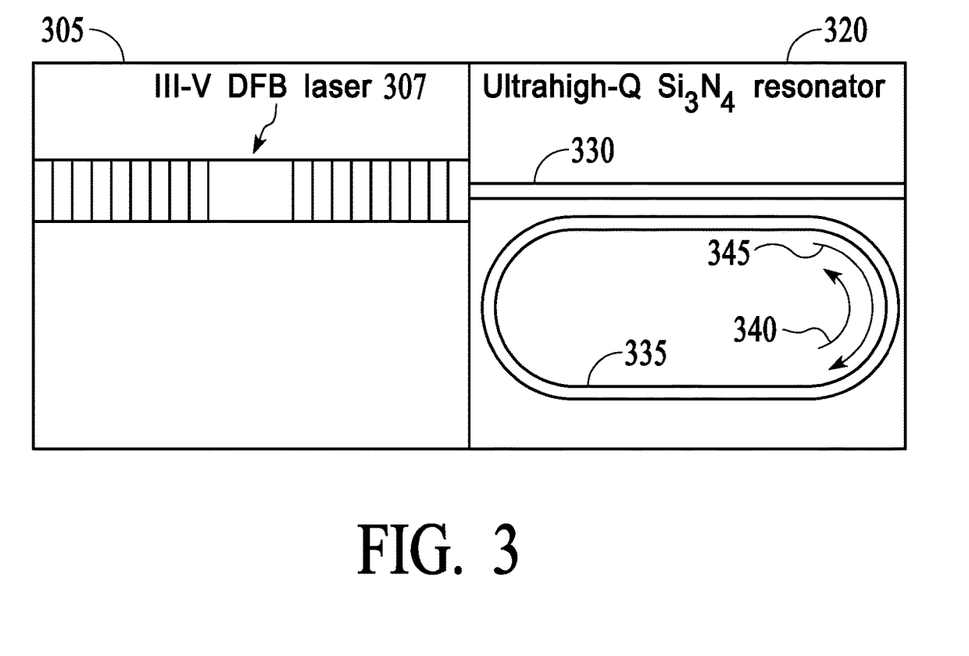
FIG. 3 illustrates a schematic top view of hybrid-integrated narrow-linewidth semiconductor laser butt-coupled to ultra-high-Q (quality factor) SiN microresonator built on a SiN waveguide-based sensing chip, according to an embodiment of the present disclosure.

FIG. 3 illustrates a schematic top view of hybrid-integrated narrow-linewidth semiconductor laser butt-coupled to ultra-high-Q (shortened term for high quality factor) SiN microresonator built on a SiN waveguide-based sensing chip, according to an embodiment of the present disclosure. The Q factor (quality factor) of any resonator is a measure of the strength of the damping of its oscillations, or for the relative linewidth. Specifically, the laser chip 305 is a compound semiconductor (III-V, such as indium phosphide (InP)) chip with a tunable Distributed Feedback (DFB) laser injection-locked to a microresonator. The DFB laser 307 comprises a cavity and gratings 315 and 325 on both sides of the cavity. The laser chip 305 may have other components too for operating the laser. The laser chip 305 may be hybridly integrated (attached, bonded or grown) on a silicon platform (as shown later with respect to FIGS. 5-7). The microresonator fabricated in the SiN waveguide chip 320 comprises a straight portion 330 of the waveguide and a ring 335 (which may have any shape, such as circular, oval, racetrack shape with both curved and straight portions etc.). Light from the DFB laser 307 is launched into the straight portion 330 of the waveguide, couples into the ring 335, circulates in the ring, and then couples back to 330 to go back to the DFB laser 307. The arrow 345 denotes forward-propagating light and the arrow 340 denotes backscattered light. Because of coupling into the microresonator, the injection-locked DFB laser 307's linewidth is narrowed significantly and Q-factor increases significantly (indicating that noise is largely suppressed). In a non-limiting example, linewidth can be 3 Hz, and the Q-factor can be as high as 260 million. Generally speaking, laser linewidth is targeted to be less than 100 Hz. With reducing the waveguide loss, the Q factor can be increased beyond 500 million.

Figure 4:
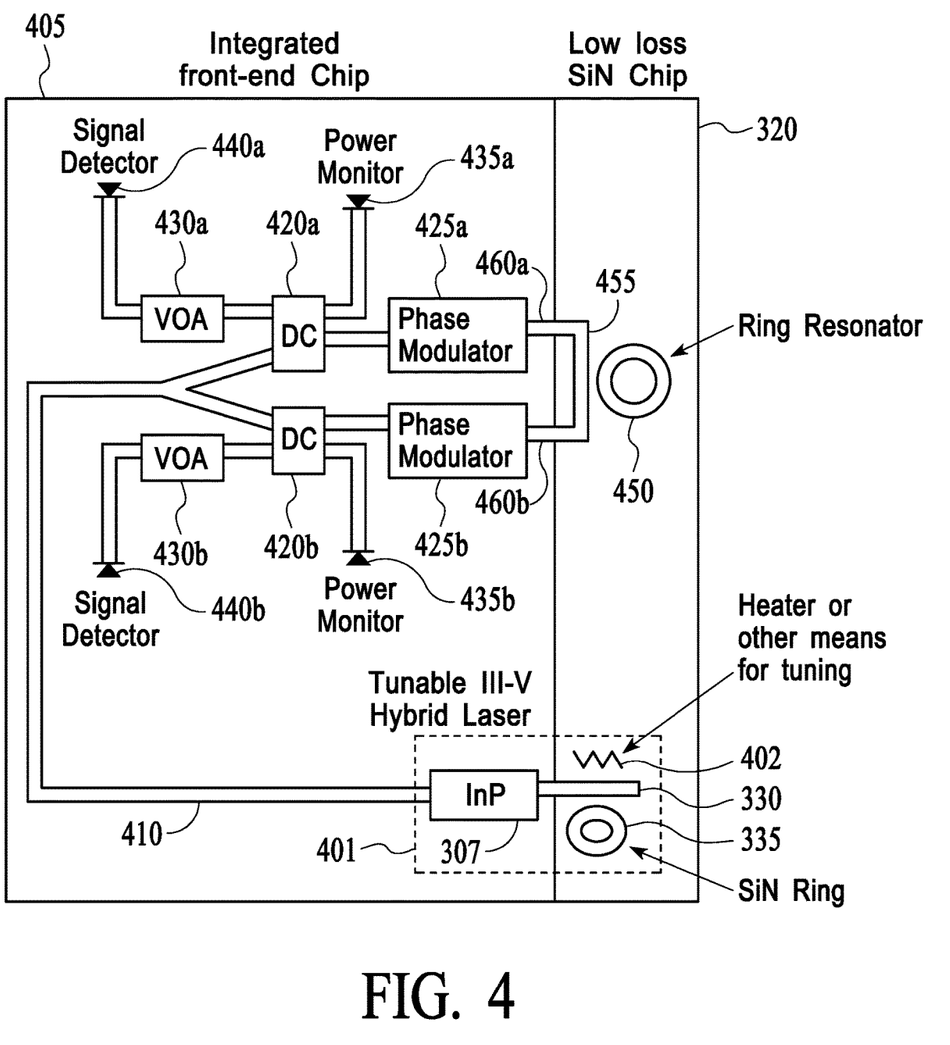
FIG. 4 illustrates a schematic top view of a noise-cancelling balanced detection scheme implemented on the front-end silicon photonics chip for the optical gyroscope which is butt-coupled to the SiN waveguide-based sensing chip with the microresonator, according to an embodiment of the present disclosure.

FIG. 4 illustrates a schematic top view of a noise-cancelling balanced detection scheme implemented on the front-end silicon photonics chip for the optical gyroscope which is butt-coupled to the SiN waveguide-based sensing chip with the microresonator, according to an embodiment of the present disclosure. Note that waveguide based components on a front-end chip (which may have an on-chip laser, or may guide light coupled from an off-chip laser) may be based on Si or III-V compound semiconductor, or a combination thereof, and may be mode-selective, as described in earlier-filed U.S. patent application Ser. No. 16/659,424, entitled, "System Architecture for Integrated Photonics Optical Gyroscopes," filed Oct. 21, 2019, which is incorporated by reference herein. Alternatively, the waveguide based components of the front end chip may be made of SiN also in an all-integrated embodiment, as described in earlier-filed co-pending U.S. Provisional Patent Application No. 62/934,184, entitled, "Multi-layer Silicon Nitride Waveguide Based Integrated Photonics Optical Gyroscopes," filed Nov. 12, 2019, which is also incorporated by reference herein.

The optical components shown in the integrated photonics front-end chip 405 in FIG. 4 achieve balanced detection of signal coming back from a gyroscope sensing ring 450 fabricated on the SiN waveguide chip 320. Note that this could be the same chip described in FIG. 3 where the microresonator components 330 and 335 are also fabricated. Alternatively, various SiN chips with various SiN structures can be bonded together to achieve the overall SiN architecture. For example, one SiN chip can have the microresonator 335 and another SiN chip can have the sensing microresonator 450. The components shown in FIG. 3 are shown in FIG. 4 within the dashed outline 401. The additional component shown in FIG. 4 (which was not shown in FIG. 3) is a tuning component 402. The tuning component 402 can be a metallic heater (for thermal tuning) or can be other means of tuning the linewidth of the DFB laser 307 and maintaining coupling into and out of the ring. The ring 335 may need to be tuned to compensate for drift and other effects.

Narrow linewidth optical signal from the DFB laser 307 is carried by the waveguide 410, which splits into two arms at the Y-junction. Each arm has a directional coupler (DC) (420a and 420b) and phase modulators (425a and 425b). The two output waveguides 460a and 460b launch the laser light into the straight portion 455 of the sensing microresonator, from where light is coupled into the ring portion 450 of the sensing microresonator. Due to the low loss of the SiN chip 320, ring 450 could have very high Q-factor, hence narrow linewidth and low noise laser and overall system are needed. Again the ring 450 can be of any closed loop shape, such as a circle, an oval or a racetrack-shaped closed loop. The waveguide portions 455 and 450 constitute the sensing portion of the optical gyroscope. Optical signal coming back from the sensing microresonator are coupled back into the waveguides 460*a* and 460*b*, and ultimately detected at the signal detectors 440*a* and 440*b*. The branches of the directional couplers leading to the signal detectors 440*a* and 440*b* may have a respective variable optical attenuator (VOA) 430*a* and 430*b* respectively. Additionally, power monitor detectors 435*a* and 435*b* may also be coupled to the directional couplers. Note that some of the signal detectors 440*a* and 440*b* as well as the power monitors 435*a* and 435*b* may be photodiodes (e.g., Germanium (Ge)-based photodiodes) or avalanche photodiodes (APDs) (e.g., Ge-based APDs).

The VOAs 430*a* and 430*b* are used to adjust power (via electronic feedback) to ensure detected power is the same in both branches. This way balanced power detection is achieved, which is used to cancel noise and increase gyroscope sensitivity. Components of electronic feedback are not shown in FIG. 4 for clarity, but can be found in the earlier-filed co-owned U.S. patent application Ser. No. 16/659,424, entitled, "System Architecture for Integrated Photonics Optical Gyroscopes," filed Oct. 21, 2019, which is incorporated by reference herein. Laser light may be injected into the microresonator ring from two sides. To reduce the noise, the balanced detection scheme is used to distinguish the drift from the optical signal of interest from the rotation sensing element (i.e. the Sagnac signal) versus the thermal drift.

Figure 5:
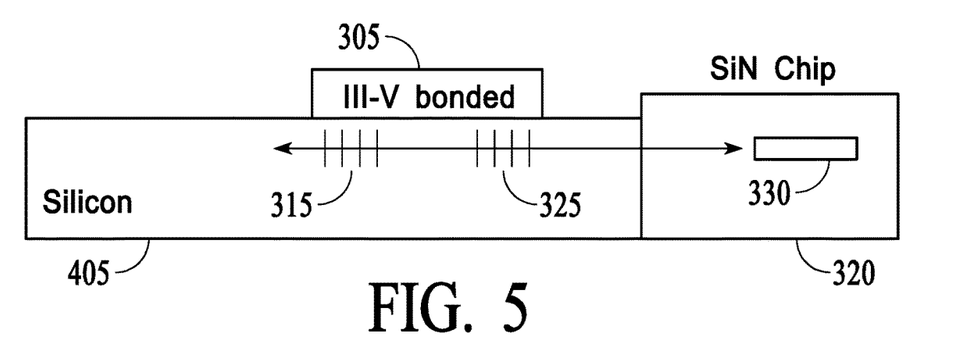
FIG. 5 illustrates a longitudinal cross-sectional view of an integrated optical gyroscope, where the front-end chip has a semiconductor laser bonded to it, and the front-end chip is butt-coupled to the SiN waveguide-based sensing chip, according to an embodiment of the present disclosure.

FIG. 5 illustrates a longitudinal cross-sectional view of an integrated optical gyroscope, where the front-end chip 405 (which can be a silicon chip) has a III-V semiconductor laser chip 305 bonded to it, and the front-end chip 405 is butt-coupled to the SiN waveguide-based sensing chip 320, according to an embodiment of the present disclosure. The arrow indicates that light is coupled from the semiconductor laser into the SiN ring 330.

Figure 6:
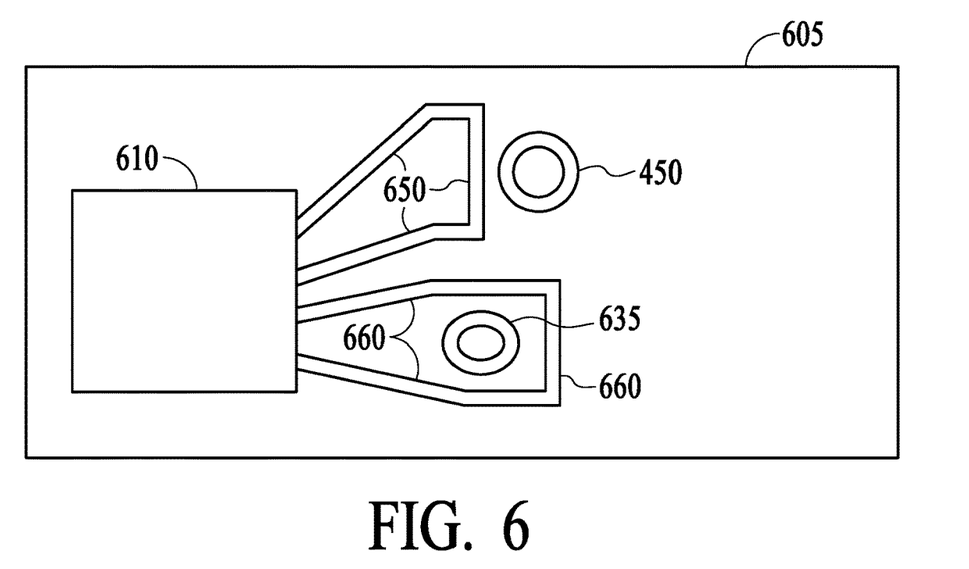
FIG. 6 illustrates a top view of a SiN waveguide chip with a silicon photonics portion within the SiN waveguide chip for bonding the semiconductor laser onto it, according to another embodiment of the present disclosure.
Figure 7:
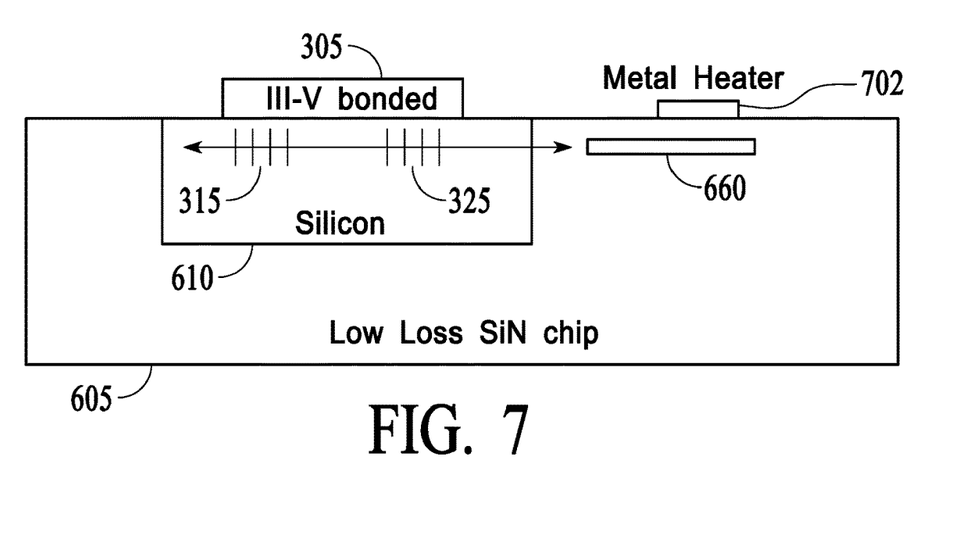
FIG. 7 illustrates a longitudinal cross-sectional view of the embodiment shown in FIG. 6.

FIG. 6 illustrates a top view of a SiN waveguide chip 605 with a silicon photonics portion 610 within the SiN waveguide chip 605, according to another embodiment of the present disclosure. The III-V semiconductor laser chip 305 is bonded onto the silicon photonics portion 610, as shown in FIG. 7, which illustrates a longitudinal cross-sectional view of the embodiment shown in FIG. 6. SiN waveguides 660 can be used for routing optical signal to the ring microresonators, such as the sensing ring microresonator 450 (as shown and described in FIG. 4), and laser ring microresonator 635 (equivalent to the ring 335 shown in FIGS. 3 and 4). In one embodiment, a metal heater 702 (equivalent to the tuning means 402 shown in FIG. 4) can be fabricated as a means to tune the linewidth of the III-V laser (which could be an indium phosphide (InP) laser).

Note that waveguide based components on a front-end chip (which may have an on-chip laser, or may guide light coupled from an off-chip laser) may be based on Si or III-V compound semiconductor, or a combination thereof, and may be mode-selective, as described in earlier-filed U.S. patent application Ser. No. 16/659,424, entitled, "System Architecture for Integrated Photonics Optical Gyroscopes," filed Oct. 21, 2019, which is incorporated by reference herein. Alternatively, the waveguide based components of the front end chip may be made of SiN also in an all-integrated embodiment, as described in earlier-filed co-pending co-owned U.S. Provisional Patent Application No. 62/934,184, entitled, "Multi-layer Silicon Nitride Waveguide Based Integrated Photonics Optical Gyroscopes," filed Nov. 12, 2019, which is also incorporated by reference herein.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense. Additionally, the directional terms, e.g., "top", "bottom" etc. do not restrict the scope of the disclosure to any fixed orientation, but encompasses various permutations and combinations of orientations.

What is claimed is:

1. An optical gyroscope fabricated as an integrated photonics chip, comprising:
 a first portion of the integrated photonics chip comprising waveguide-based optical components, wherein a narrow linewidth laser light is launched from the first portion of the integrated photonics chip to a second portion of the integrated photonics chip; and
 a rotation sensing element in the second portion of the integrated photonics chip that receives the narrow linewidth laser light from the first portion, wherein the narrow linewidth of the laser light dictates a quality factor of the rotation sensing element,
 wherein the first portion and the second portion of the integrated photonics chip are packaged together on a common platform, and the rotation sensing element produces an output optical signal that is divided equally to propagate into two symmetrical waveguide branches leading to two respective photodetectors to achieve balanced power detection.

2. The optical gyroscope of claim 1, wherein the first portion comprises a stand-alone front-end chip.

3. The optical gyroscope of claim 2, wherein the second portion comprises a stand-alone sensing chip containing the rotation sensing element.

4. The optical gyroscope of claim 3, wherein the stand-alone front-end chip is butt-coupled to the stand-alone sensing chip so that the narrow linewidth laser light aligns to the rotation sensing element for efficient coupling.

5. The optical gyroscope of claim 3, wherein the stand-alone sensing chip comprises silicon nitride waveguide core.

6. The optical gyroscope of claim 5, wherein the narrow-linewidth laser light is produced by a semiconductor laser integrated with the first portion of the integrated photonics chip.

7. The optical gyroscope of claim 6, wherein the semiconductor laser is injection-locked to a laser microresonator ring.

8. The optical gyroscope of claim 6, wherein the rotation sensing element comprises a linear input waveguide and a sensing microresonator ring whose quality factor is dictated by the narrow linewidth laser light.

9. The optical gyroscope of claim 5, wherein a linewidth of the semiconductor laser is thermally tuned by a heater.

10. The optical gyroscope of claim 1, wherein the first portion of the integrated photonics chip comprises the two photodetectors that detect power of the output optical signal from the rotation sensing element.

11. The optical gyroscope of claim 10, wherein the waveguide-based optical components on the first portion of the integrated photonics chip comprise symmetrical elements along the two symmetrical waveguide branches to achieve balanced power detection of the output optical signal from the rotation sensing element.

12. The optical gyroscope of claim 11, wherein each waveguide branch comprises a directional coupler.

13. The optical gyroscope of claim 12, wherein each waveguide branch comprises a variable optical attenuator.

14. The optical gyroscope of claim 13, wherein each waveguide branch comprises a phase modulator.

15. The optical gyroscope of claim 1, wherein the common platform is a silicon nitride (SiN) platform including monolithically integrated second portion that comprises SiN-based rotation sensing elements.

16. The optical gyroscope of claim 15, wherein a cavity is created within the SiN platform into which the first portion of the integrated photonics chip is hybridly integrated, wherein the first portion contains components made of non-SiN materials.

17. The optical gyroscope of claim 16, wherein the non-SiN materials include silicon photonics components.

18. The optical gyroscope of claim 17, wherein the non-SiN materials include III-V compound semiconductor based components that are bonded or grown on the silicon photonics components.

19. The optical gyroscope of claim 16, wherein the non-SiN materials include germanium or silicon germanium photodiodes or avalanche photodetectors.

20. The optical gyroscope of claim 16, wherein the non-SiN materials include phase modulators made of electro-optic materials.

* * * * *